(12) United States Patent
Hirase

(10) Patent No.: US 7,988,583 B2
(45) Date of Patent: Aug. 2, 2011

(54) FINAL REDUCTION GEAR DEVICE

(75) Inventor: Hiromi Hirase, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 675 days.

(21) Appl. No.: 12/128,881

(22) Filed: May 29, 2008

(65) Prior Publication Data

US 2008/0300085 A1      Dec. 4, 2008

(30) Foreign Application Priority Data

Jun. 1, 2007    (JP) ................................ 2007-146986

(51) Int. Cl.
*F16H 48/06*    (2006.01)

(52) U.S. Cl. ....................................... 475/225; 475/221

(58) Field of Classification Search .................. 475/225, 475/221, 204
See application file for complete search history.

(56) References Cited

U.S. PATENT DOCUMENTS

| | | | | |
|---|---|---|---|---|
| 4,541,503 A | * | 9/1985 | Akutagawa et al. | 180/249 |
| 4,817,753 A | * | 4/1989 | Hiketa | 180/249 |
| 5,695,426 A | * | 12/1997 | Lippitsch | 475/204 |

FOREIGN PATENT DOCUMENTS

| | | |
|---|---|---|
| JP | 64-006548 A | 1/1989 |
| JP | 2007-040339 | 2/2007 |

* cited by examiner

*Primary Examiner* — Tisha D Lewis
(74) *Attorney, Agent, or Firm* — Dickstein Shapiro LLP

(57) ABSTRACT

A final reduction gear device including an orthogonal axis gear and a speed reduction mechanism portion employing a planetary gear is provided. A radial bearing, more specifically a cylindrical roller bearing, having a large radial load capacity is disposed between a bevel ring gear of the orthogonal axis gear and a differential case. A thrust bearing, more specifically a thrust ball bearing or a thrust roller bearing, having a large axial load capacity is disposed between an axial end portion of a sun gear, and an inner race side of the radial bearing and the side of a fitting portion of the differential case, to which the inner race is fitted. A thrust bearing, more specifically a thrust ball bearing or a thrust roller bearing, having a large axial load capacity is disposed between the bevel ring gear and a planetary carrier of the speed reduction mechanism portion.

2 Claims, 5 Drawing Sheets

FINAL REDUCTION GEAR DEVICE

CROSS-REFERENCE TO RELATED APPLICATIONS

The disclosure of Japanese Patent Application No. 2007-146986 filed on Jun. 1, 2007 including the specification, drawings and abstract is incorporated herein by reference in its entirety.

BACKGROUND OF THE INVENTION

1. Field of the Invention

The present invention relates to a final reduction gear device, and more particularly to a final reduction gear device comprising an orthogonal axis gear, and a speed reduction mechanism portion employing a planetary gear.

2. Description of the Related Art

In an orthogonal axis gear of a conventional final reduction gear device, as shown in FIG. 3, a skew gear, or in other words a so-called hypoid gear, is used (see Japanese Unexamined Patent Application Publication 2007-40339, for example), but as the offset of the hypoid gear increases, friction during a low load period increases. Therefore, as shown in FIG. 4, the efficiency of the final reduction gear device may be improved by using a zero offset intersecting axis gear, or in other words by using a so-called bevel gear or spiral bevel gear (1), in place of the hypoid gear and interposing a speed reduction mechanism portion (3) employing a planetary gear between the bevel gear (1) and a differential gear mechanism portion (2) (see Japanese Unexamined Patent Application Publication S64-6548, for example).

However, in the final reduction gear device of Japanese Unexamined Patent Application Publication S64-6548, as shown in FIG. 4, a housing (6) that connects a bevel ring gear (4) to a sun gear (5) is supported while straddling left and right output shafts (8), (8) via a differential box (7), and as a result, the size and weight of the final reduction gear device increase.

To solve this problem, the housing (6) may be formed such that it is supported on one of the left and right output shafts (8), (8), as shown in FIG. 5, thereby increasing the compactness of the final reduction gear device. However, although the compactness of the final reduction gear device is increased, the bevel ring gear (4) and an internal gear (9) of the speed reduction mechanism portion (3) are supported in a cantilevered fashion, and therefore, unless the support rigidity of the bevel ring gear (4) and the internal gear (9) is improved, the rotation of the bevel ring gear (4) becomes unstable during power transmission, leading to tooth bearing defects, defects in the alignment of a planetary gear (10) of the speed reduction mechanism portion (3) and so on, a degradation in efficiency, and the generation of noise.

SUMMARY OF THE INVENTION

The present invention has been designed in consideration of these circumstances, and it is an object thereof to provide a final reduction gear device that is capable of improving efficiency and reducing noise generation by stabilizing the tooth bearing of various gears, while remaining compact.

To achieve the object described above, a first invention is a final reduction gear device in which a rotary drive force transmitted from an input shaft is deflected in an axis of rotation by an orthogonal axis gear, an output gear of which is disposed coaxially with a differential case of a differential gear mechanism portion, then transmitted to the differential case via a speed reduction mechanism portion that is disposed coaxially with the differential case and includes a sun gear, which is provided as a continuation of the output gear of the orthogonal axis gear and allocated to input, an internal gear which is fixed, and a planetary carrier which is allocated to output, and then transmitted to left and right output shafts by a differential pinion that rotates in the interior of the differential case integrally with the differential case, and a differential side gear that meshes with the differential pinion. In this final reduction gear device, a first bearing member having a large radial load capacity is disposed between the output gear of the orthogonal axis gear and the differential case, a second bearing member having a large axial load capacity is disposed between the sun gear, and an inner race of the first bearing member and the differential case, and a third bearing member having a large axial load capacity is disposed between the output gear of the orthogonal axis gear and the planetary carrier.

According to the first invention, the radial load that acts on the output gear of the orthogonal axis gear during power transmission is received by the first bearing member, and the axial load is distributed between the first and second bearing members. Thus, the support rigidity of the output gear of the orthogonal axis gear can be increased without increasing the size and weight of the final reduction gear device. As a result, shaft wobbling during rotation of the output gear of the orthogonal axis gear is eliminated, the rotation is stabilized, and tooth bearing defects are prevented, and therefore tooth contact noise in the orthogonal axis gear can be reduced greatly.

In a second invention for achieving the object described above, pertaining to the constitution of the first invention, a spigot portion is formed on an outer peripheral surface portion of a holding member for holding a fourth bearing member, which is attached to a case main body forming an outer shell of the final reduction gear device and supports the differential case rotatably, a fitting portion that is fitted to the spigot portion is formed in the internal gear, and the internal gear is fixed to the case main body with the fitting portion fitted to the spigot portion.

According to the second invention, the internal gear is fixed to the case main body after improving the positioning precision and support rigidity thereof by fitting the fitting portion thereof to the spigot portion of the holding member. Thus, the alignment performance and support rigidity of the internal gear relative to the left and right output shafts and a planetary gear can be further improved, enabling an improvement in meshing precision and a reduction in tooth contact noise among the various gears of the speed reduction mechanism portion.

According to the final reduction gear device of the present invention, the support rigidity of a bevel ring gear and an internal gear can be improved without increasing the size of a case main body, and therefore an efficient final reduction gear device that is capable of reducing tooth bearing defects among various gears during power transmission and reducing alignment defects in a planetary gear mechanism can be provided.

BRIEF DESCRIPTION OF THE DRAWINGS

These and other objects and advantages of the present invention will become more clear from the following description with reference to the accompanying drawings, wherein.

DETAILED DESCRIPTION OF THE PREFERRED EMBODIMENTS

Figure 1:
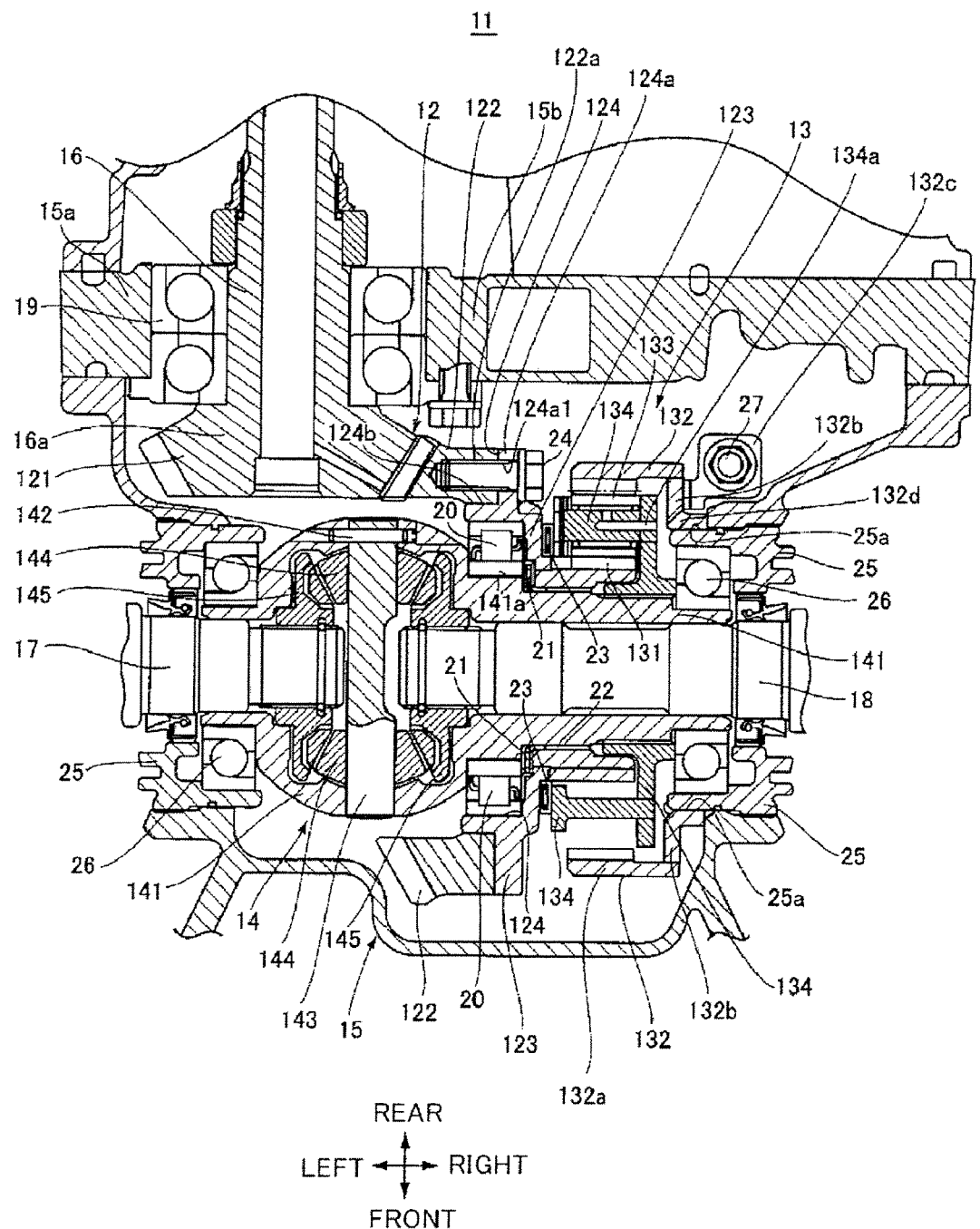
FIG. 1 is a sectional plan view of a final reduction gear device according to an embodiment of the present invention.

A final reduction gear device according to an embodiment of the present invention will be described in detail below with reference to FIGS. 1 and 2. FIG. 1 is a sectional view showing an embodiment of the final reduction gear device, and FIG. 2 is a side view of FIG. 1.

As shown in FIG. 1, a final reduction gear device 11 according to the present invention comprises an orthogonal axis gear 12, a speed reduction mechanism portion 13 employing a planetary gear, and a differential gear mechanism portion 14.

Figure 2:
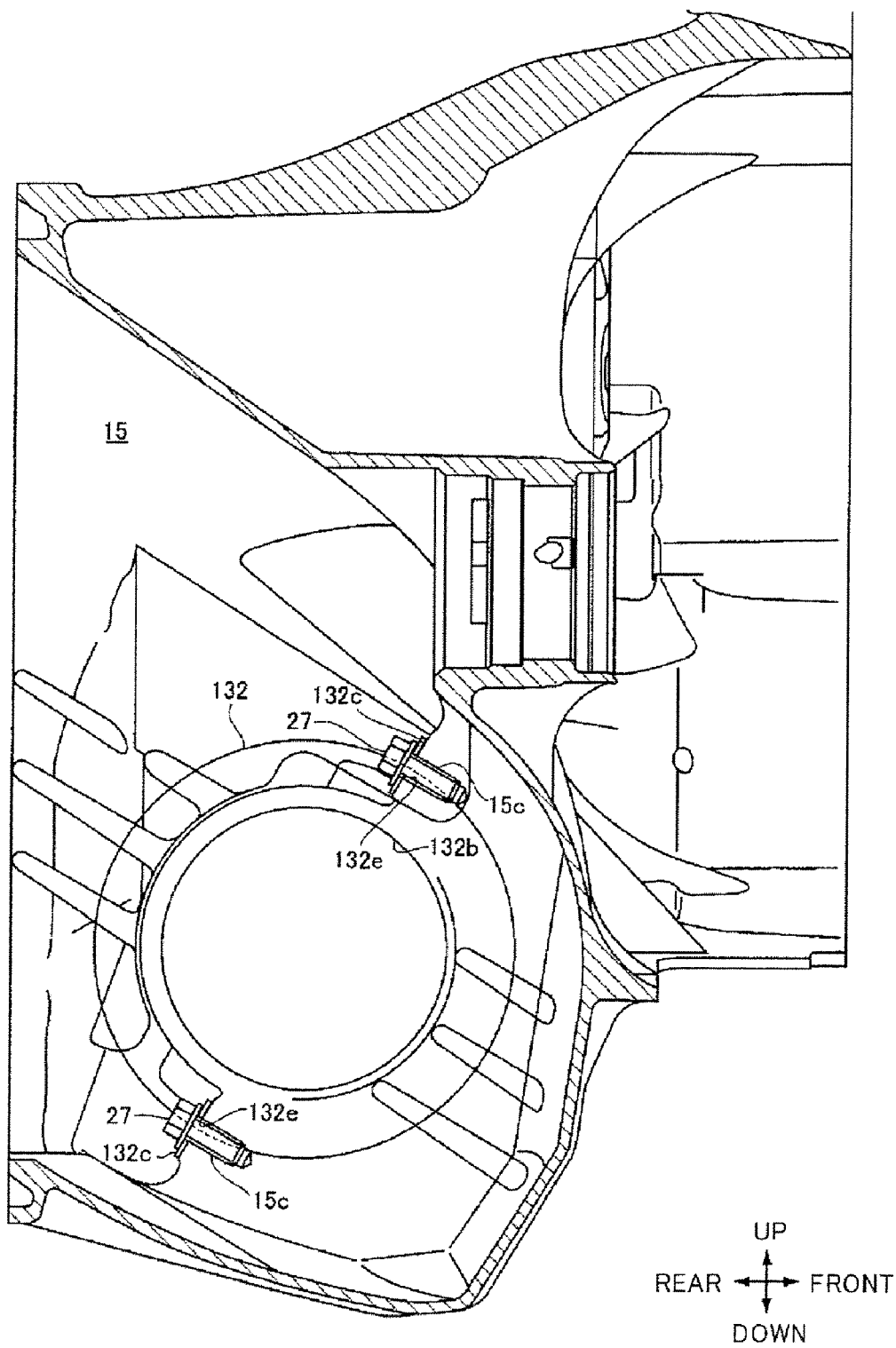
FIG. 2 is a side view of FIG. 1.
Figure 3:
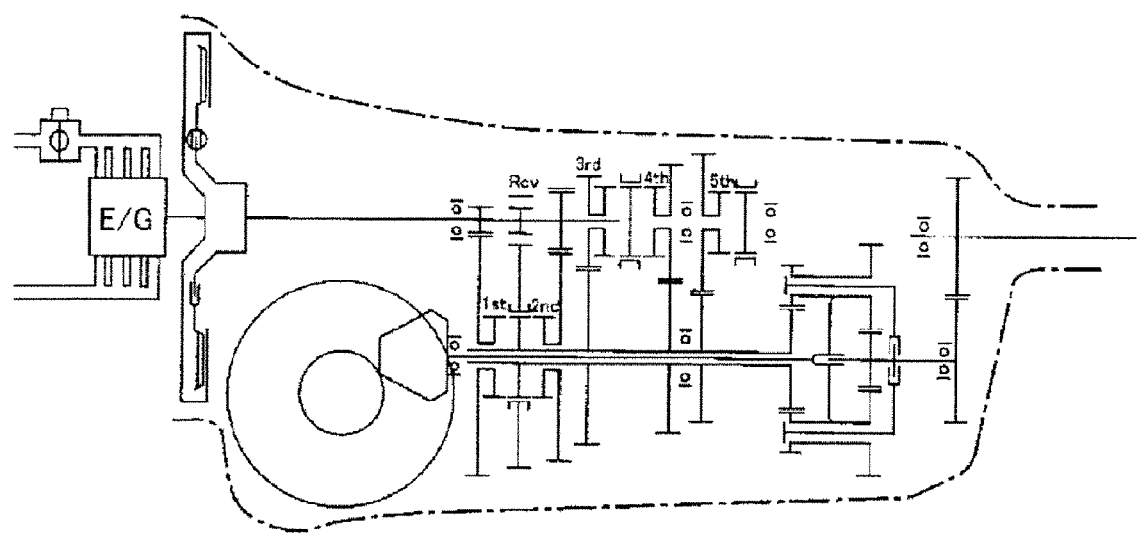
FIG. 3 is a skeleton diagram illustrating a conventional final reduction gear device.
Figure 4:
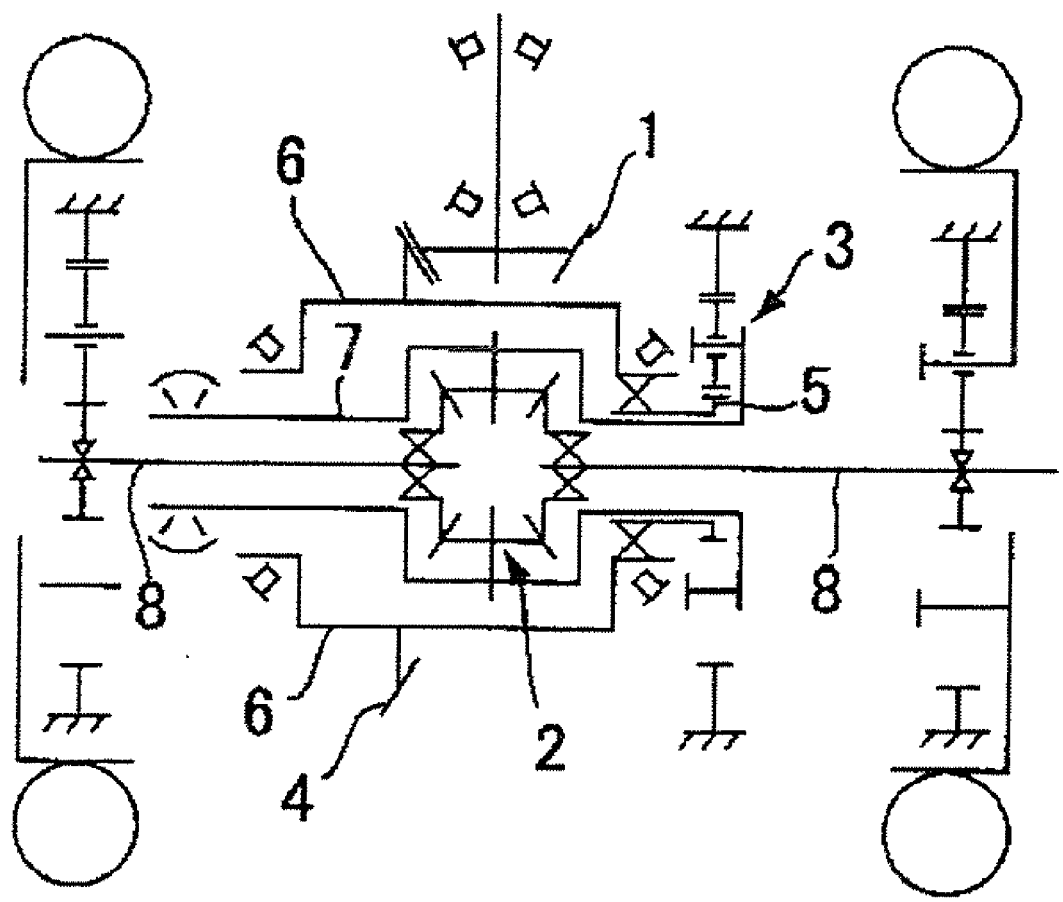
FIG. 4 is a pattern diagram showing a different conventional final reduction gear device to that shown in FIG. 3.
Figure 5:
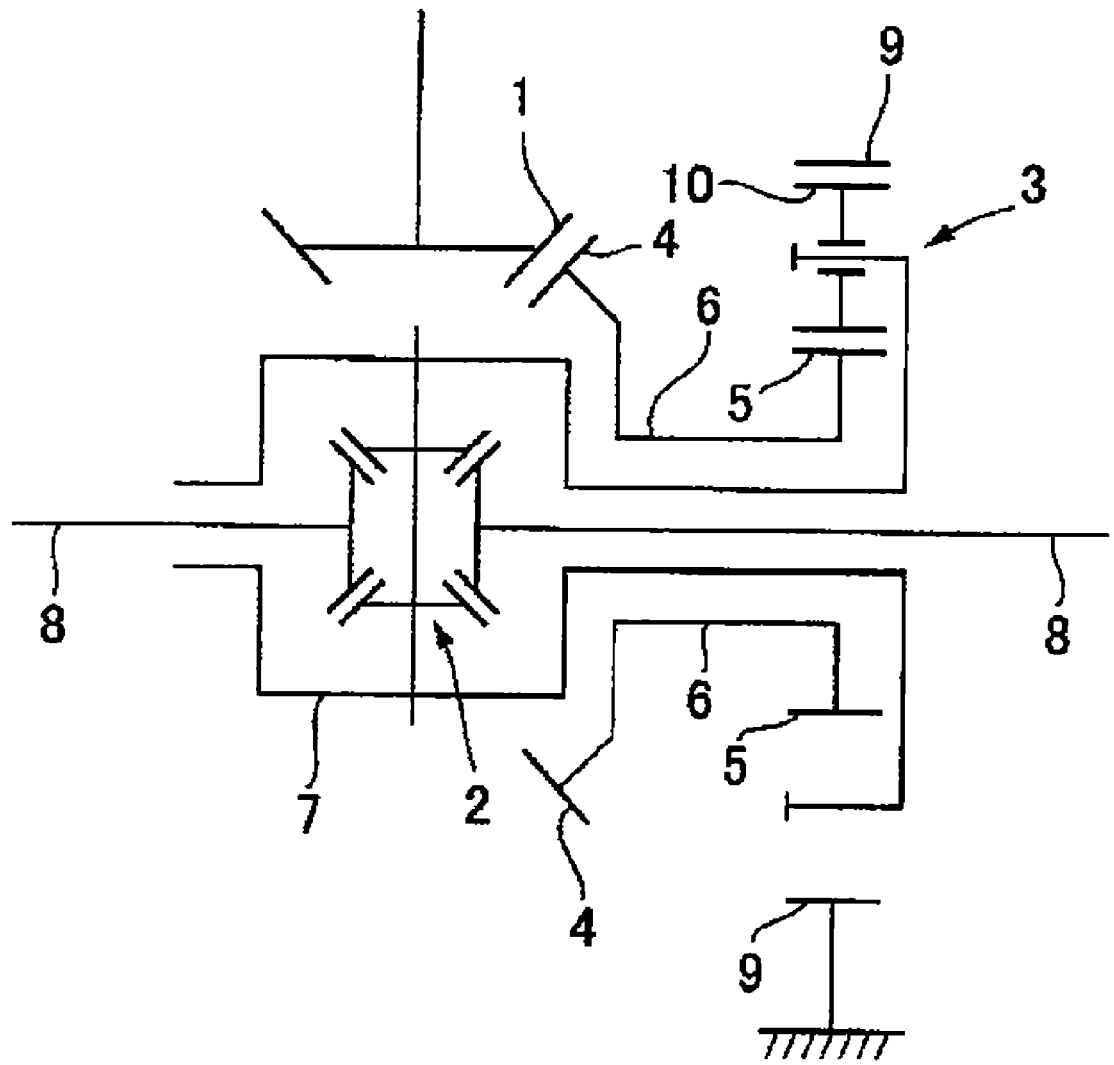
FIG. 5 is a pattern diagram showing a different conventional final reduction gear device to that shown in FIG. 4.

Note that FIGS. 1 and 2 show a state in which the final reduction gear device 11 is disposed in a transmission case 15 serving as a case main body that is provided as a continuation of a longitudinal engine, not shown in the drawings. In FIG. 1, the lower side and upper side of the paper surface indicate the front and rear, respectively, while in FIG. 2, the right side of the drawing indicates the front side.

The orthogonal axis gear 12 comprises a bevel pinion gear 121, and a bevel ring gear 122 that meshes with the bevel pinion gear 121. The bevel pinion gear 121 is provided integrally with a front end portion of an input shaft 16 that is supported rotatably on the transmission case 15 forming the outer shell of the final reduction gear device 11. Further, the bevel ring gear 122 is disposed coaxially with a differential case 141 of the differential gear mechanism portion 14 in a diametrical direction thereof.

The speed reduction mechanism portion 13 comprises a sun gear 131 provided as an integral continuation of the bevel ring gear 122 and supported to be capable of rotating relative to the differential case 141, an internal gear 132 fixed to the transmission case 15, a planetary gear 133 that meshes with the sun gear 131 and the internal gear 132, and a planetary carrier 134 that supports the planetary gear 133 rotatably and is provided as an integral continuation of the differential case 141.

The differential gear mechanism portion 14 comprises the differential case 141, to which the planetary carrier 134 is connected integrally and which is supported rotatably on the transmission case 15, a pinion shaft 143 that is fixed in a retained fashion within the differential case 141 by a straight pin 142, a pair of differential bevel pinions 144, 144 serving as differential pinions that are supported rotatably on the pinion shaft 143, and a left-right pair of differential bevel gears 145, 145 that mesh with the differential bevel pinions 144, 144 and serve as differential side gears provided as a continuation of left and right output shafts 17, 18.

In further detail, the input shaft 16 is a power transmission shaft for transmitting the rotary drive force of an engine or the like, an output side (bevel gear side) 16a of which is supported rotatably via an angular ball bearing 19 (back-to-back duplex bearing) disposed between left and right support portions 15a, 15b in the transmission case 15. The angular ball bearing 19 is employed because it is suitable for receiving a combined load of an axial load and a radial load and exhibits high moment rigidity. Further, an axial center direction of the input shaft 16 is orthogonal to an axial center direction of the left and right output shafts 17, 18, and an axial end portion of the output side 16a of the input shaft 16 is disposed in the vicinity of the left side output shaft 17. The bevel pinion gear 121 is formed integrally with the axial end portion of the output side 16a of the input shaft 16. The bevel ring gear 122 that meshes with the bevel pinion gear 121 is provided as an integral continuation of the sun gear 131 via a linking member 123. Note that here, the linking member 123 is considered to be a part of the bevel ring gear 122.

The bevel ring gear 122 is supported so as to be capable of rotating relative to the differential case 141 via a radial bearing 20 serving as a first bearing member, a thrust bearing 21 serving as a second bearing member, and a bush 22. Further, a thrust bearing 23 serving as a third bearing member is interposed between the bevel ring gear 122 and the planetary carrier 134.

More specifically, an outer peripheral portion of the linking member 123 is formed with a fixing portion 124 for fixing the bevel ring gear 122 to the linking member 123 using a plurality of fixing bolts 24 when joined to a back surface and an inner peripheral surface of the bevel ring gear 122. The fixing portion 124 comprises a back plate portion 124a and a seat surface portion 124b.

The back plate portion 124a is formed with evenly distributed holes 124a1 (only one of which is shown in FIG. 1) through which the fixing bolts 24 are passed, and the bevel ring gear 122 is formed with screw holes 122a into which the fixing bolts 24 passed through the evenly distributed holes 124a1 are screwed.

The bevel ring gear 122 is inserted into the outer peripheral side of the seat surface portion 124b, and the outer race of a bearing member that has a large radial load capacity and is therefore suited to heavy loads, for example the radial bearing 20 (which is preferably a cylindrical roller bearing), is fitted into the inner peripheral side of the seat surface portion 124b, or in other words the surface side opposing the differential case. The inner race of the radial bearing 20 is fitted into a fitting portion 141a formed as a recess in the outer peripheral surface of the differential case 141. In other words, the radial bearing 20 is disposed in the diametrical direction of the bevel ring gear 122, i.e. between the bevel ring gear 122 and the differential case 141, and therefore a radial load acting on the bevel ring gear 122 during power transmission is received by the radial bearing 20. As a result, the support rigidity of the bevel ring gear 122 is enhanced, and tooth contact noise between the bevel pinion gear 121 and bevel ring gear 122 is reduced.

Note that the radial bearing 20 is not limited to a cylindrical roller bearing alone, and other roller bearings, for example a tapered roller bearing, a self-aligning roller bearing, or a needle roller bearing, may be used. Alternatively, a ball bearing such as a deep groove ball bearing or an angular ball bearing may be used. Further, the number of rows of rolling bodies is not limited to a single row, and a plurality of rows may be provided. Furthermore, as long as the bearing member is capable of receiving a radial load, a thrust bearing may be used instead.

The thrust bearing 21, which serves as the second bearing member and has a large axial load capacity, is interposed between opposing surfaces of the axial end portion of the sun gear 131, or in other words the inner peripheral side of the linking member 123 (a joint portion between the linking member 123 and the sun gear 131), and the inner race side of the radial bearing 20 and the side of the fitting portion 141a of the differential case 141 to which the inner race is fitted. Further, the thrust bearing 23, which serves as the third bearing member and has a large axial load capacity, is interposed between opposing surfaces of the linking member 123 and the planetary carrier 134.

More specifically, the thrust bearings 21, 23 are disposed so as to sandwich the linking member 123 from the left and right, and therefore the thrust bearing 23 receives an axial load (thrust load) acting on the linking member 123, or in other words the bevel ring gear 122, in the left-right direction of FIG. 1, while the thrust bearing 21 receives an axial load acting on the linking member 123 in the right-left direction of FIG. 1. Further, the thin tubular bush 22, which serves as a bearing member having a radial load capacity, is interposed between opposing surfaces of the sun gear 131 and the differential case 141. Thus, the axial load that acts on the bevel ring gear 122 during power transmission is dispersed between the thrust bearings 21, 23, while the radial load that acts on the sun gear 131 is received by the bush 22. As a result, the support rigidity of the bevel ring gear 122 is further enhanced, and tooth contact noise between the bevel pinion gear 121 and bevel ring gear 122 is reduced.

Note that the thrust bearings 21, 23 may be either thrust ball bearings (for example, thrust angular ball bearings) or thrust roller bearings (for example, thrust cylindrical roller bearings, thrust needle roller bearings, and thrust tapered roller bearings). Alternatively, as long as the bearing member is capable of receiving an axial load, a radial bearing may be used instead.

The speed reduction mechanism portion 13 employs a single pinion-type planetary gear mechanism in which the sun gear 131 provided as a continuation of the bevel ring gear 122 is allocated to input, the internal gear 132 is fixed, and the planetary carrier 134 is allocated to output. The planetary gear 133, which meshes with the sun gear 131 and internal gear 132, is supported rotatably by the planetary carrier 134, and the planetary carrier 134 is provided as an integral continuation of the outer peripheral surface of the differential case 141 by means of a spline engagement.

The speed reduction mechanism portion 13 decreases a rotational speed input from the sun gear 131 using a speed reduction ratio (a+c)/a set in accordance with a number of teeth a of the sun gear 131 and a number of teeth c of the internal gear 132, and transmits the decreased rotational speed to the differential case 141. Furthermore, the speed reduction mechanism portion 13 is formed such that the planetary carrier 134 rotates in an identical direction to the rotational direction of the sun gear 131.

Note that although the speed reduction mechanism portion 13 employs a single pinion-type planetary gear mechanism, it is not limited thereto, and may employ a double pinion-type planetary gear mechanism.

The support structure of the internal gear 132 will now be described.

The internal gear 132 comprises a fitting portion 132b that extends from a gear main body portion 132a, which meshes with the planetary gear 133, so as to be joined like a socket and spigot joint, or in other words positioned and held with a high degree of precision, to a left end portion of an axle holder 25 serving as a holding member on the right side of FIG. 1, and two fixing flange portions 132c, 132c (shown in FIG. 2) provided on the outer peripheral side of the fitting portion 132b for bolting the internal gear to the transmission case.

When the axle holder 25 is fitted into the fitting potion 132b, the fitting portion 132b is formed with an L-shaped cross-section so as to be ring-shaped when seen from the side, thereby blocking the axle holder side of the internal gear 132. Further, the fitting portion 132b is provided with an oil passage 132d so that lubricating oil can pass between the axle holder side and the planetary carrier side of the fitting portion 132b. An oil passage 134a is also formed in the interior of the planetary carrier 134, and therefore the lubricating oil that passes through these oil passages 132d, 134a is capable of lubricating not only a sliding portion between the planetary gear 133 and planetary carrier 134, but also a meshing surface between the internal gear 132 and planetary gear 133 and a meshing surface between the sun gear 131 and planetary gear 133.

As shown in FIG. 2, bolt holes 132e, 132e through which fixing bolts 27, 27 pass are formed in the respective centers of the two fixing flange portions 132c, 132c, and a central position of each bolt hole 132e substantially matches an outer peripheral radius of the internal gear 132. Further, the two fixing flange portions 132c, 132c are provided at a 180 degree interval such that a height difference is provided therebetween, and the high side fixing flange portion 132c is positioned further toward the front side (engine side) than the low side fixing flange portion 132c.

As shown in FIG. 1, the axle holder 25 is interposed between the transmission case 15 and the outer race of a single row angular ball bearing 26 serving as a fourth bearing member for supporting the differential case 141 rotatably. A spigot portion 25a is provided on one end portion (the bevel ring gear side) of the axle holder 25 so as to extend along the outer race of the single row angular ball bearing 26. Further, the inner race of the single row angular ball bearing 26 is disposed so as to receive the axial load that acts on the planetary carrier 134.

Note that the bearing member is not limited to a single row angular ball bearing alone, and another bearing member may be used as long as the bearing member is capable of receiving a radial load, an axial load, and a combined load thereof.

As shown in FIGS. 1 and 2, by means of the fixing bolts 27, 27, which are passed through the respective fixing flange portions 132c after the fitting portion 132b of the internal gear 132 is fitted onto the outer peripheral side of the spigot portion 25a of the axle holder 25 so as to improve the positioning precision and support rigidity of the internal gear 132, and which double as a fixing member that are screwed into bolt holes 15c formed in the transmission case 15, the internal gear 132 is bolted rigidly to the transmission case 15. As a result, the support rigidity and alignment performance of the internal gear 132 are greatly improved, enabling an improvement in meshing precision and a reduction in tooth contact noise among the various gears 131 to 133 of the speed reduction mechanism portion 13.

The support structure of the internal gear 132 was described above.

A drive force transmitted to the differential case 141 is transmitted from the pinion shaft 143 to the pair of differential bevel pinions 144, 144, and then transmitted from the pair of differential bevel gears 145, 145 that mesh with the differential bevel pinions 144, 144 to the left and right output shafts 17, 18. As a result, left and right drive wheels, not shown in the drawings, rotate.

According to the present invention described above, the radial load that acts on the bevel ring gear 122 of the orthogonal axis gear 12 during power transmission is received by the radial bearing 20, while the axial load is distributed between the thrust bearings 21, 23. Thus, the support rigidity of the bevel ring gear 122 can be increased without increasing the size and weight of the final reduction gear device 11. As a result, shaft wobbling during rotation of the bevel ring gear 122 is eliminated, the rotation is stabilized, and tooth bearing defects are prevented, and therefore tooth contact noise in the orthogonal axis gear 12 can be reduced greatly.

Also according to the present invention, the positioning precision and support rigidity of the internal gear 132 are improved by fitting the fitting portion 132*b* thereof to the spigot portion 25*a* of the axle holder 25, and thus the internal gear 132 is bolted rigidly to the transmission case 15. In so doing, the support rigidity and alignment performance of the internal gear 132 can be improved, enabling an improvement in meshing precision and a reduction in tooth contact noise among the various gears 131 to 133 of the speed reduction mechanism portion 13.

Note that in this embodiment, a zero offset bevel gear is used as the orthogonal axis gear 12, but the present invention is not limited thereto, and a near-zero offset hypoid gear (a skew gear) may be used instead.

Further, this embodiment may be applied to a final reduction gear device that employs parallel axis gears as well as a final reduction gear device employing an orthogonal axis gear. This embodiment may also be applied to a rear differential device.

While there has been described what are at present considered to be preferred embodiments of the present invention, it will be understood that various modifications may be made thereto, and it is intended that the appended claims cover all such modifications as fall within the true spirit and scope of the present invention.

What is claimed is:

1. A final reduction gear device in which a rotary drive force transmitted from an input shaft is deflected in an axis of rotation by an orthogonal axis gear, an output gear of which is disposed coaxially with a differential case of a differential gear mechanism portion, then transmitted to said differential case via a speed reduction mechanism portion that is disposed coaxially with said differential case and includes a sun gear, which is provided as a continuation of said output gear of said orthogonal axis gear and allocated to input, an internal gear which is fixed, and a planetary carrier which is allocated to output, and then transmitted to left and right output shafts by a differential pinion that rotates in the interior of said differential case integrally with said differential case, and a differential side gear that meshes with said differential pinion, wherein a first bearing member having a large radial load capacity is disposed between said output gear of said orthogonal axis gear and said differential case, a second bearing member having a large axial load capacity is disposed between said sun gear, and an inner race of said first bearing member and said differential case, and a third bearing member having a large axial load capacity is disposed between said output gear of said orthogonal axis gear and said planetary carrier.

2. The final reduction gear device according to claim 1, wherein a spigot portion is formed on an outer peripheral surface portion of a holding member for holding a fourth bearing member, which is attached to a case main body forming an outer shell of said final reduction gear device and supports said differential case rotatably, a fitting portion that is fitted to said spigot portion is formed in said internal gear, and said internal gear is fixed to said case main body, with said fitting portion fitted to said spigot portion.

* * * * *